US008223386B2

(12) United States Patent
Oyama et al.

(10) Patent No.: US 8,223,386 B2

(45) Date of Patent: Jul. 17, 2012

(54) IMAGE FORMING APPARATUS WITH DETECTING DEVICES FOR IMAGE POSITIONING ON REVERSED SHEET

(75) Inventors: Hiroshi Oyama, Hino (JP); Utami Soma, Hachioji (JP); Atsushi Takahashi, Akishima (JP); Tadashi Matsudaira, Hachioji (JP); Youbao Peng, Hino (JP); Shinpei Kawasaki, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1320 days.

(21) Appl. No.: 11/868,301

(22) Filed: Oct. 5, 2007

(65) Prior Publication Data

US 2008/0123116 A1 May 29, 2008

(30) Foreign Application Priority Data

Nov. 24, 2006 (JP) ................................ 2006-317668

(51) Int. Cl.
*G06K 15/00* (2006.01)

(52) U.S. Cl. ....... 358/1.18; 358/474; 358/496; 358/498; 235/454; 345/158

(58) Field of Classification Search ................. 358/1.18, 358/474, 496, 498; 235/454; 345/158
See application file for complete search history.

(56) References Cited

U.S. PATENT DOCUMENTS

| | | | | |
|---|---|---|---|---|
| 5,091,654 | A * | 2/1992 | Coy et al. | 250/559.29 |
| 5,956,161 | A * | 9/1999 | Takashimizu et al. | 358/496 |
| 6,137,989 | A * | 10/2000 | Quesnel | 399/394 |
| 6,374,075 | B1 * | 4/2002 | Benedict et al. | 399/395 |
| 2004/0184853 | A1 * | 9/2004 | Matsuzaka et al. | 399/394 |
| 2005/0286922 | A1 * | 12/2005 | Oki | 399/75 |

FOREIGN PATENT DOCUMENTS

| | | |
|---|---|---|
| JP | A 2001-013845 | 1/2001 |
| JP | A 2003-156974 | 5/2003 |
| JP | A 2006-110952 | 4/2006 |

OTHER PUBLICATIONS

Japan Patent Office, Notice of Reasons for Refusal in Corresponding Application 2006-317668, Dated Sep. 14, 2011, 3 pages.

* cited by examiner

*Primary Examiner* — Jacky X Zheng

(74) *Attorney, Agent, or Firm* — Finnegan, Henderson, Farabow, Garrett & Dunner, L.L.P.

(57) ABSTRACT

An image forming apparatus provided with an image forming section forming a reference mark at the position being away from the leading edge of the front surface of a sheet by a prescribed length, and forming an image for the front surface based on the forming position of the reference mark, a transfer sheet reversing section reversing the sheet, a leading edge detection sensor detecting the leading edge of the rear surface of the sheet and a mark detection sensor detecting the forming position of the reference mark on the sheet based on the leading edge of the rear surface of the transfer sheet, and the image forming section forms an image on the rear surface of the transfer sheet based on the forming position of the reference mark on the sheet whose reference point is the leading edge of the rear surface of the transfer sheet.

15 Claims, 10 Drawing Sheets

STRUCTURAL EXAMPLE OF COLOR PRINTER 100 OF AN EMBODIMENT

STRUCTURAL EXAMPLE OF COLOR PRINTER 100 OF AN EMBODIMENT

RELATIONAL EXAMPLE BETWEEN SENSOR DISTANCE "L" AND DETECTION TIME DIFFERENCE "T" OF FIRST EMBODIMENT

RELATIONAL EXAMPLE BETWEEN REFERENCE MARK "Mi" AND REAR SURFACE IMAGE ON TRANSFER SHEET P' (CASE No. 1)

RELATIONAL EXAMPLE BETWEEN REFERENCE MARK "Mi" AND REAR SURFACE IMAGE ON TRANSFER SHEET P' (CASE No. 2)
FIG. 4 ( A )
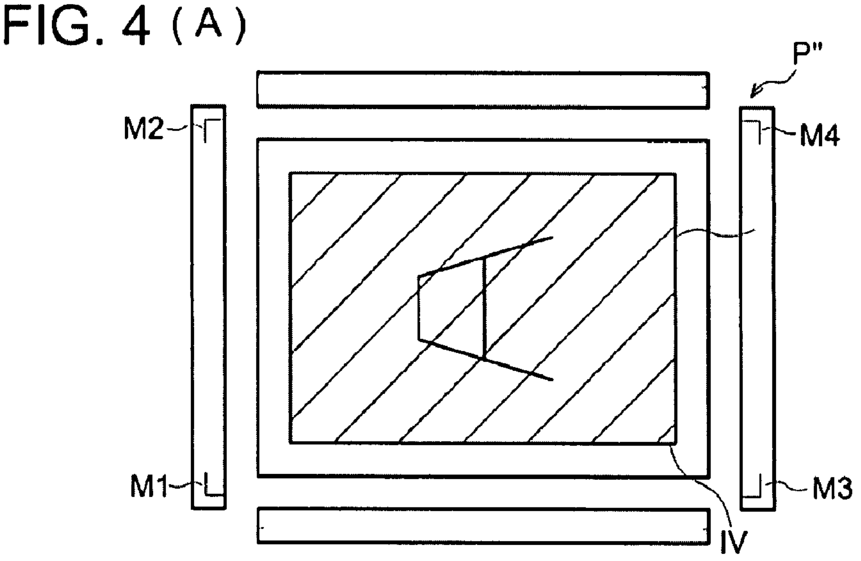
FIG. 4 ( B )
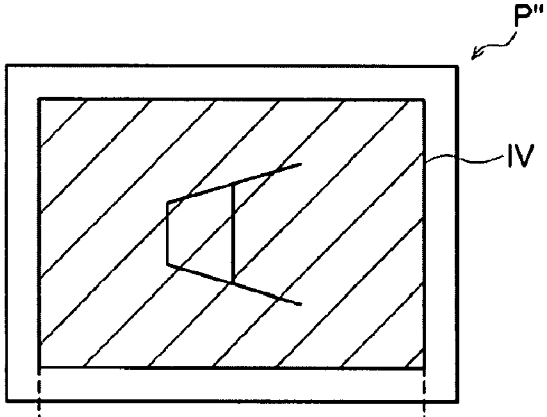
FIG. 4 ( C )
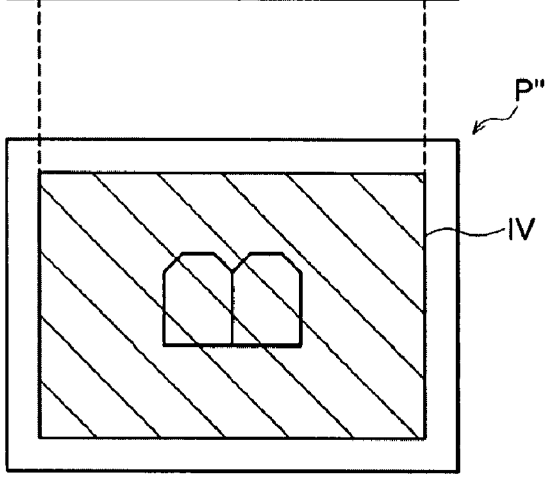

STRUCTURAL EXAMPLE OF CONTROL SYSTEM ON COLOR PRINTER 100

EXAMPLE OF IMAGE FORMING ON COLOR PRINTER 100 (CASE No.1)

EXAMPLE OF IMAGE FORMING ON COLOR PRINTER 100 (CASE No.2)

STRUCTURAL EXAMPLE OF MULTI-FUNCTIONAL TYPE OPTICAL SENSOR PS3 RELATING TO SECOND EMBODIMENT

OPERATIONAL EXAMPLE OF OPTICAL SENSOR PS3

EXAMPLE OF LIGHTING CONTROL OF OPTICAL SENSOR PS3 ON CONTROL SECTION 15

IMAGE FORMING APPARATUS WITH DETECTING DEVICES FOR IMAGE POSITIONING ON REVERSED SHEET

BACKGROUND OF THE INVENTION

The present invention relates to an image forming apparatus and an image forming method which can be appropriately applied to a color printer, a color copying machine equipped with a two-sided image-forming mode that forms color images on the front and rear surfaces of a sheet and to a multifunctional machine having functions of the foregoing.

In recent years, use of a color printer and a color copying machine both being of a tandem type and of a color multifunctional machine including functions of the aforesaid items has become popular. In the image forming apparatus equipped with the single-sided image-forming mode of this kind, when reproducing R color, G color and B color of a color image, toner images for respective colors of yellow (Y), magenta (M), cyan (C) and black (BK) are formed on photoconductor drums for respective colors, and the toner images for respective colors formed on the photoconductor drums for respective colors are superposed on an intermediate transfer belt. The color toner images superposed on the intermediate transfer belt are transferred onto a desired sheet, and then, are subjected to fixing processing to be ejected.

Further, in an image forming apparatus equipped with a two-sided image-forming mode that forms a color image on the front and rear surfaces of a sheet, after the color image is formed on the front surface of a sheet, the sheet is reversed in terms of its front surface and rear surface in a transfer sheet reverse path, and a color image is transferred onto the rear surface of the sheet by conducting the aforesaid process again on the rear surface of the sheet, to be subjected to fixing processing to be ejected thereafter.

In relation to the image forming apparatus equipped with the two-sided image-forming mode of this kind, an image forming apparatus is disclosed by Patent Document 1. In this image forming apparatus, in the case of registration of images on the front and rear surfaces, an image detection sensor is arranged on the intermediate belt, and a first surface reading sensor is arranged in a reverse conveyance path, whereby, in the case of two-sided printing, a distance from a trailing edge of the first surface of the sheet to a reference image of the first surface image is detected by the first surface reading sensor, then, a reference image of an image for the second surface on the intermediate transfer body is detected, thus, sheet conveyance timing in the course of image forming on the second surface is controlled based on the results of the aforesaid both detections. If an apparatus is constructed in the aforesaid manner, reference images on the front surface and the rear surface can be aligned accurately.

Further, a recording apparatus coping with a two-sided image-forming mode is disclosed in Patent Document 2. In this recording apparatus, a sensor for detecting a leading edge of a sheet is arranged on the downstream side where a sheet supply path and a reverse conveyance path join, whereby, relationship between a trailing edge of the first surface of the sheet and an image position is detected by the sensor in the case of two-sided printing, and a position of a leading edge of the sheet is detected in the case of recording on the second surface to establish a position of image recording on the second surface based on the results of the aforesaid detections. If an apparatus is constructed in the aforesaid manner, reference images on the front surface and the rear surface can be aligned accurately by the same sensor.

Incidentally, the image forming apparatus equipped with a two-sided image-forming mode relating to the conventional example has the following problems.

(1) In the image forming apparatus described in Patent Document 1, when aligning positions of reference images on the front surface and the rear surface, a reference image of an image for the first surface is detected by an image detection sensor arranged on an intermediate transfer body, and a distance from the trailing edge of the first surface of a transfer sheet to the first reference image formed on the front surface of the sheet is detected by the first surface reading sensor provided on the reverse conveyance path.

Therefore, when an edge portion of a transfer sheet after fixing is curled or is fluttered, its influence causes a form of an edge or a position of passage at the sensor to be unstable, and there is a fear that a detection error grows greater between the image detection sensor and the first surface reading sensor. Accordingly, it is difficult to align accurately a position of the image formed on the front surface of the sheet and a position of the image formed on the rear surface of the transfer sheet.

(2) In the recording apparatus described in Patent Document 2, a sensor for detecting a leading edge of a sheet is arranged on the downstream side where a sheet supply path and a reverse conveyance path join, and the sensor detects a leading edge of a transfer sheet and its reference image when conducting two-sided printing.

Accordingly, there is a fear that a detection error grows greater, in the case of detecting the leading edge of the transfer sheet and in the case of detecting the reference image. Incidentally, an optical-sensor of a reflection type (CIS) is used for the sensor having a function of two detections, and detection errors grow to the unignorable level, when accurate registration for positions on the front surface and the rear surface is desired.

Therefore, when behaviors of the leading edge of the transfer sheet are changed because of a sheet supply speed, a type of a sheet or a sensor position arrangement, a forming position for the image formed on the first surface (front surface) of the sheet disagrees with a forming position for the image formed on the second surface (rear surface) of the sheet, resulting in the problem that quality of image forming is lowered.

[Patent Document 1] Japanese Patent Publication Open to Public Inspection No. 2004-279749 (4th-5th pages, FIG. 1)

[Patent Document 2] Japanese Patent Publication Open to Public Inspection No. 11-237768 (2nd page, FIG. 1)

SUMMARY

Accordingly, an objective of the present invention is to solve the aforesaid problems and to provide an image forming apparatus and an image forming method wherein a forming position for the image formed on the first surface of the sheet and a forming position for the image formed on the second surface of the sheet can be aligned accurately.

For solving the aforesaid problems, the image forming apparatus relating to the embodiment of the invention is composed of an image forming device that forms a reference image at the position that is away from the leading edge of the first surface of the sheet by a prescribed length, and forms an image on the first surface based on the forming position of the reference image, a reversing device that reverses the sheet on which the reference image and the image for the first surface are formed by the image forming device, the first detecting device that detects the leading edge of the second surface of the sheet reversed by the reversing device and the second detecting device that detects a position of forming of the reference image of the sheet based on the leading edge of the second surface detected by the first detecting device, wherein the image forming device forms an image on the second surface of the sheet based on the forming position of the reference image on the sheet whose reference point is the leading edge of the second surface of the sheet detected by the second detecting device.

An image forming method relating to another embodiment has therein a process to form a reference image at a position that is away from the leading edge of the first surface of the sheet by a prescribed length and to form an image on the first surface based on the forming position for the reference image, a process to reverse the sheet on which the reference image and the image on the first surface are formed, a process to detect the leading edge of the second surface of the reversed sheet, a process to detect the forming position of the reference image on the sheet based on the detected leading edge of the second surface, and a process to form an image on the second surface based on the forming position of the reference image detected based on the leading edge on the second surface of the reversed sheet.

Figure 2:
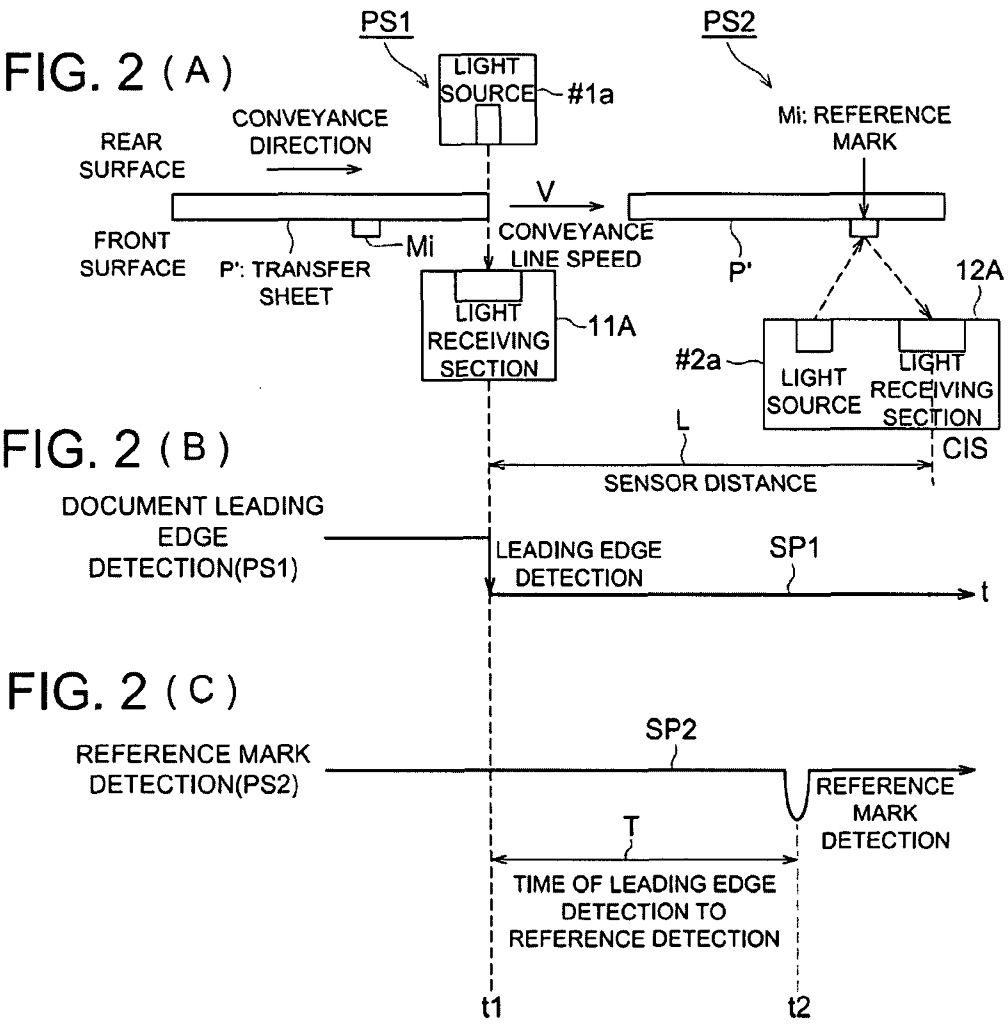

Each of FIGS. 2(A)-2(C) is a diagram showing an example of relationship between a distance L from a sensor to a sensor and detection time difference T as the first example.

Figure 3:
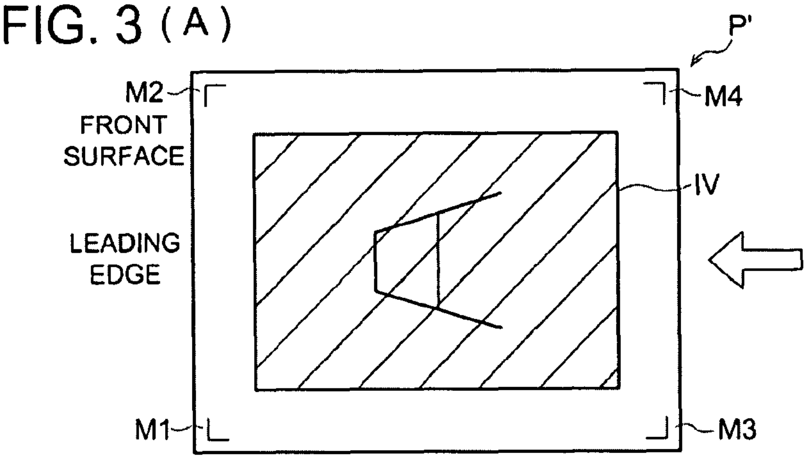
Figure 3:
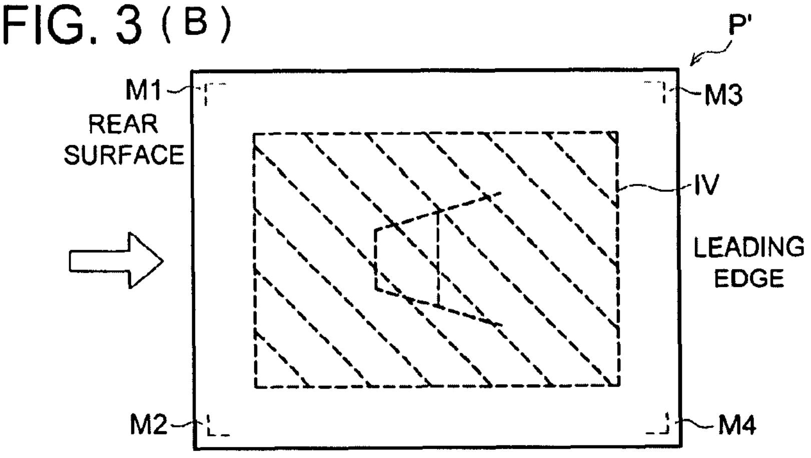
Figure 3:
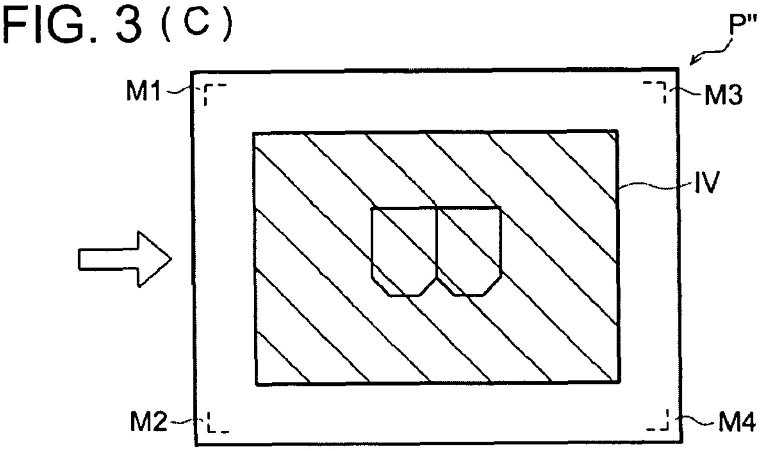

Each of FIGS. 3(A)-3(C) is a diagram showing an example of relationship (Case No. 1) between reference mark Mi and an image on the rear surface of transfer sheet P'.

Each of FIGS. 4(A)-4(C) is a diagram showing an example of relationship (Case No. 2) between reference mark Mi and an image on the rear surface of transfer sheet P'.

Figure 5:
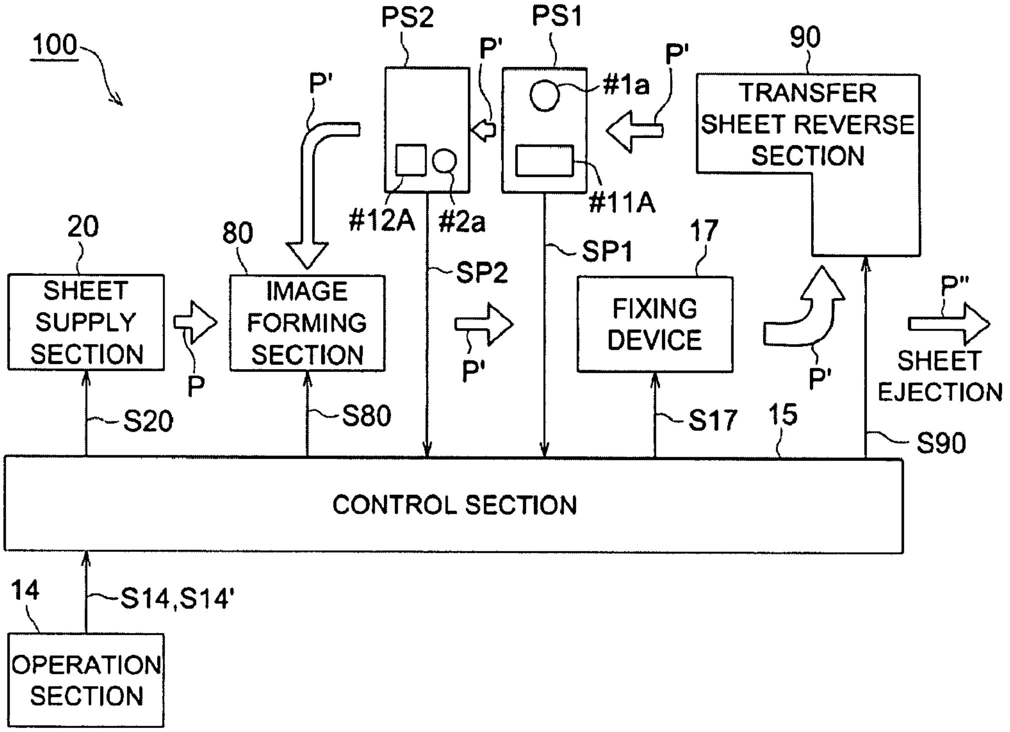

FIG. 5 is a block diagram showing an example of the structure of a control system of color printer 100.

Figure 6:
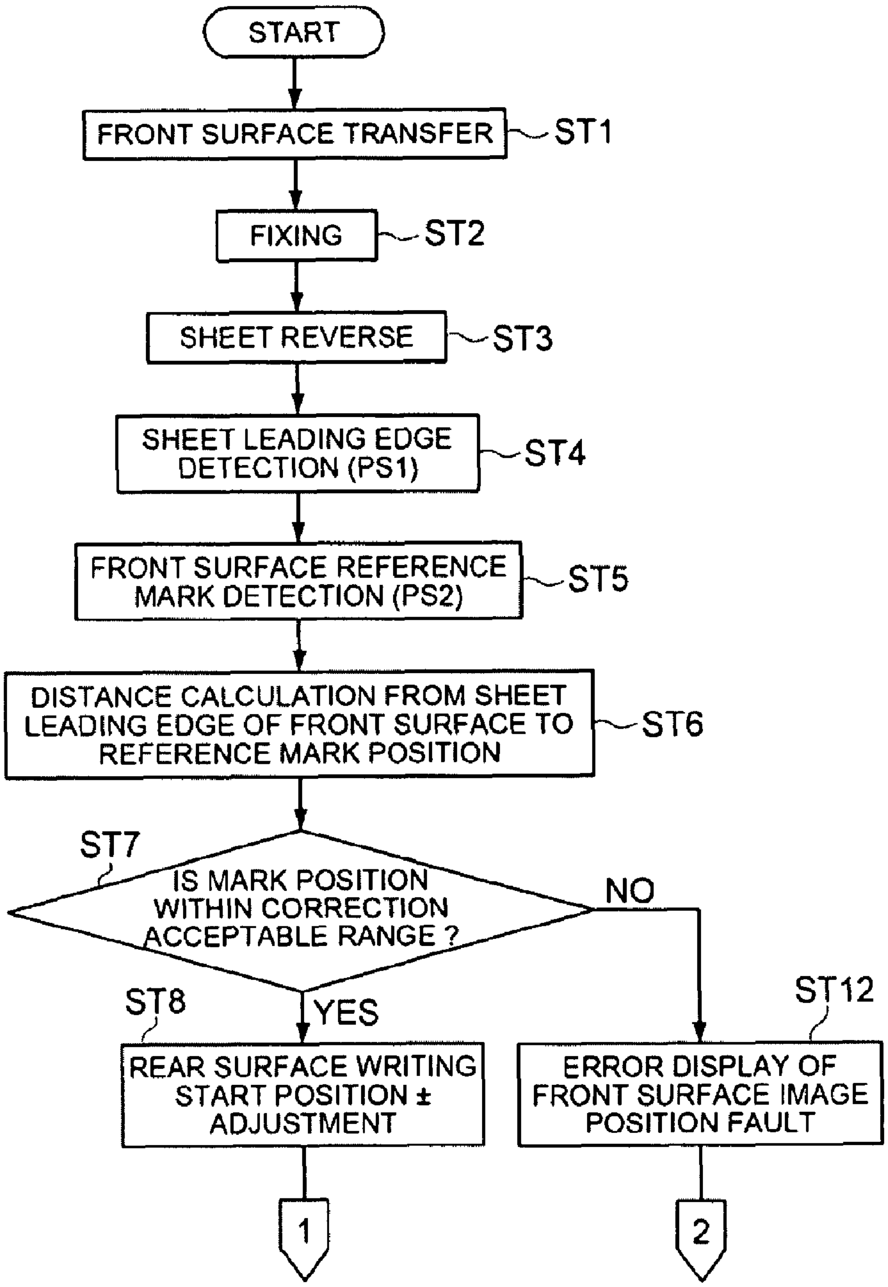

FIG. 6 is a flow chart showing an image forming example (Case No. 1) in color printer 100.

Figure 7:
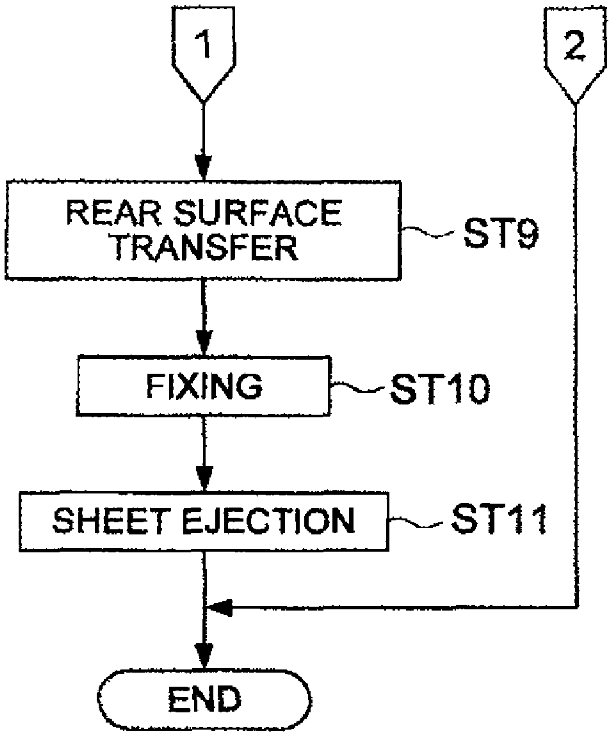

FIG. 7 is a flow chart showing an image forming example (Case No. 2) in color printer 100.

Figure 8:
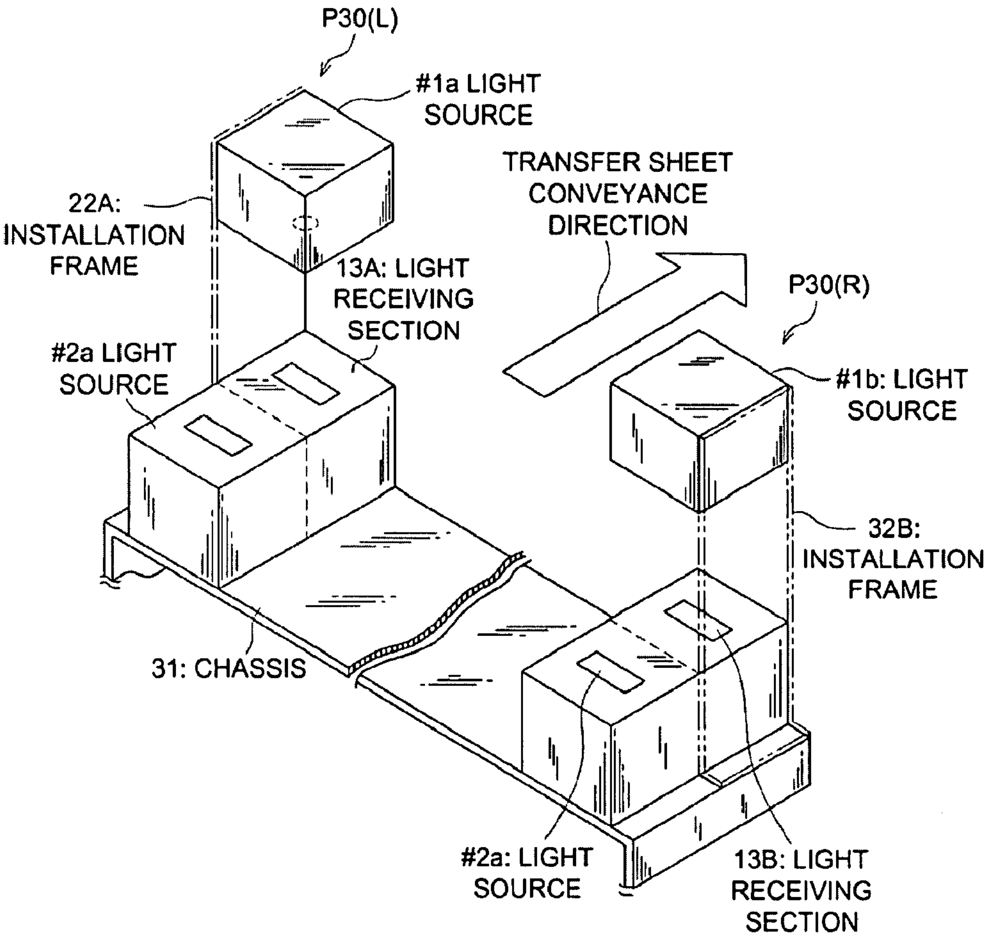

FIG. 8 is a perspective view showing an example of structure of optical-sensor PS3 of a multi-functional type relating to the Second Example.

Figure 9:
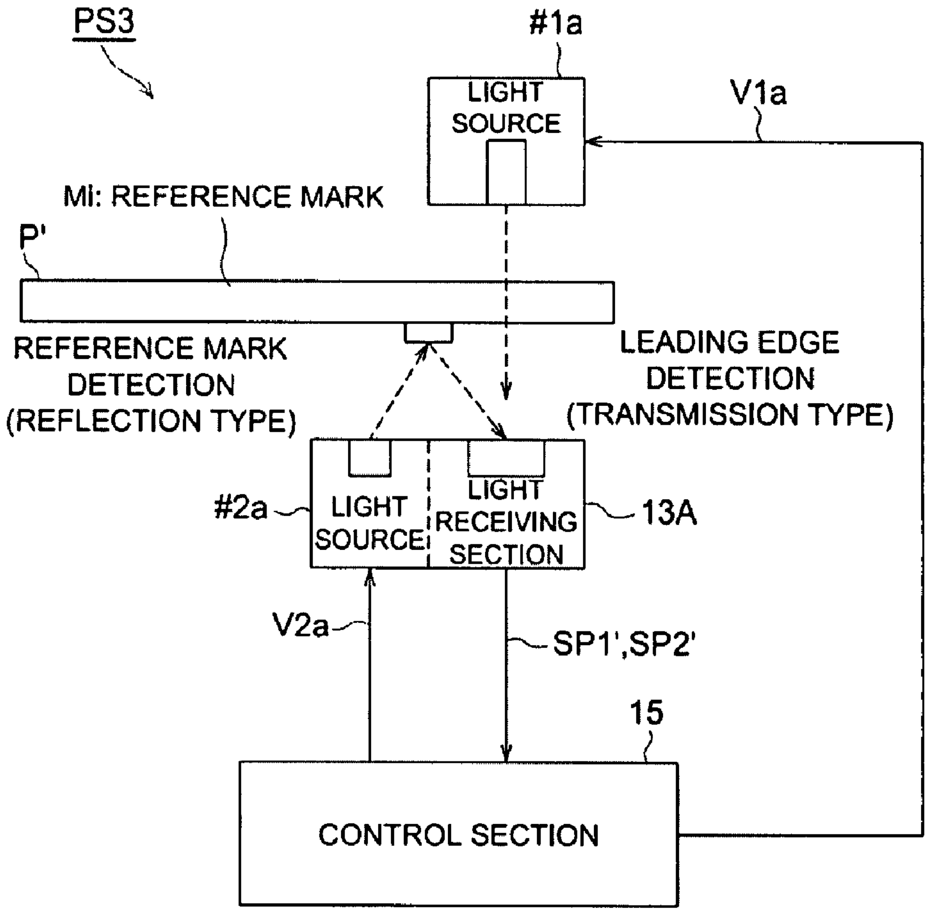

FIG. 9 is a block diagram showing an example of operations of optical-sensor PS3 of a multi-functional type.

Figure 10:
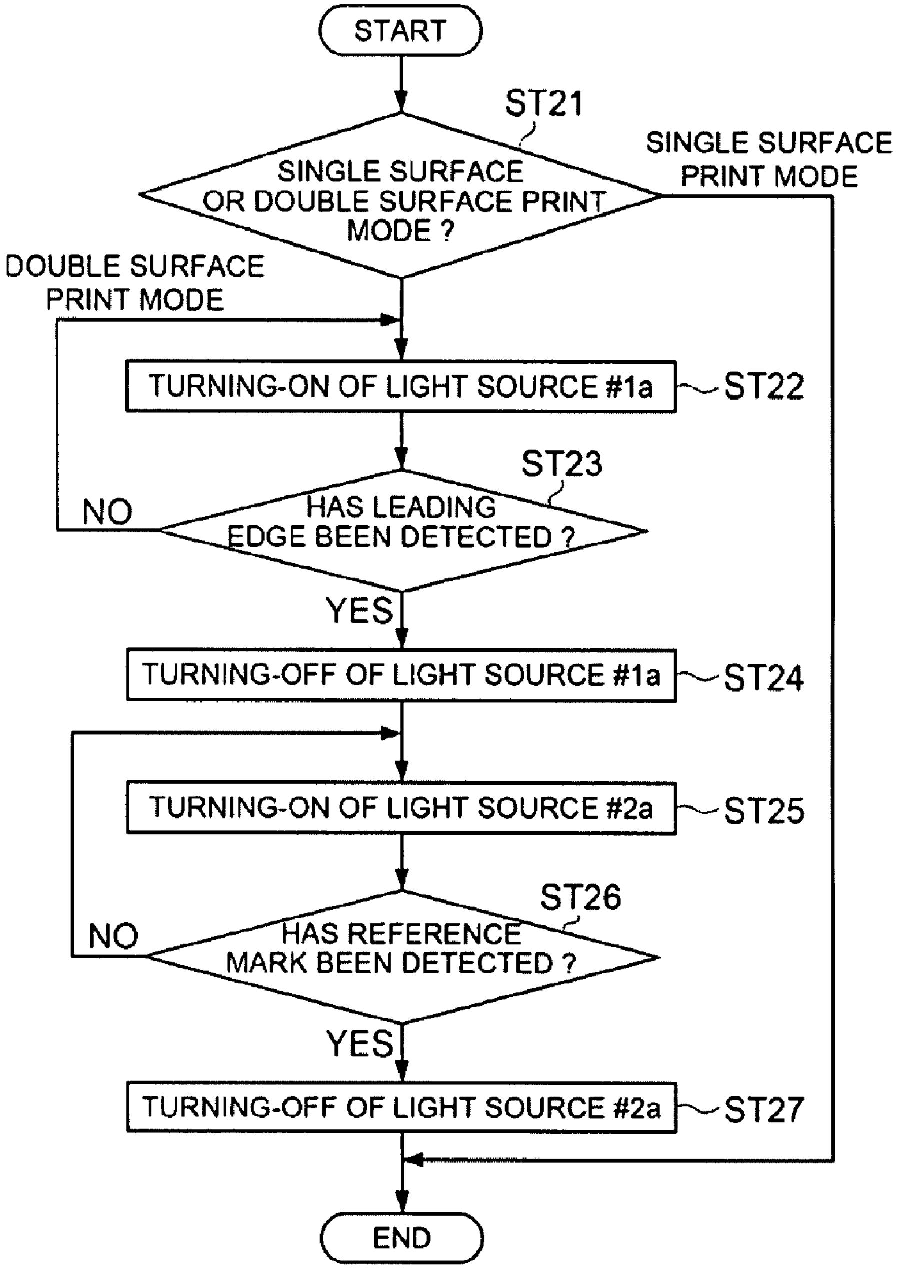

FIG. 10 is a flow chart showing an example of lighting control of optical-sensor PS3 in control section 15.

DETAILED DESCRIPTION OF THE PREFERRED EMBODIMENT

In the image forming apparatus relating to the aforesaid embodiment, an image for the second surface can be formed at the position on the second surface of the sheet aligned to the reference image formed at the position that is away from the leading edge on the second surface of the sheet by an actual length, to be more accurately, compared with an occasion where a leading edge of the sheet and a reference image are detected by a single detecting device.

An image forming apparatus relating to another embodiment is characterized to be equipped with a control device that controls the image forming apparatus so that an image may be formed on the second surface of the sheet based on a forming position of a reference image on the sheet for which the reference point is the leading edge of the second surface of the sheet detected by the second detecting device, in the aforesaid embodiment.

An image forming apparatus relating to still another embodiment is characterized in that a reverse sheet conveyance path that reverses a sheet in terms of front and rear surfaces is provided on the reversing device, and the first and the second detecting devices are provided on the reverse sheet conveyance path, in the aforesaid embodiment.

An image forming apparatus relating to further another embodiment is characterized in that an optical-sensor of a transmission type is used for the first detecting device and an optical-sensor of a contact type is used for the second detecting device, in the aforesaid embodiment.

An image forming apparatus relating to still further another embodiment is characterized in that an optical-sensor of a multifunctional type having a detecting function of the first detecting device and a detecting function of the second detecting device is used, in the aforesaid embodiment.

An image forming apparatus and an image forming method both relating to the embodiment of the invention will be described as follows, referring to the drawings.

Figure 1:
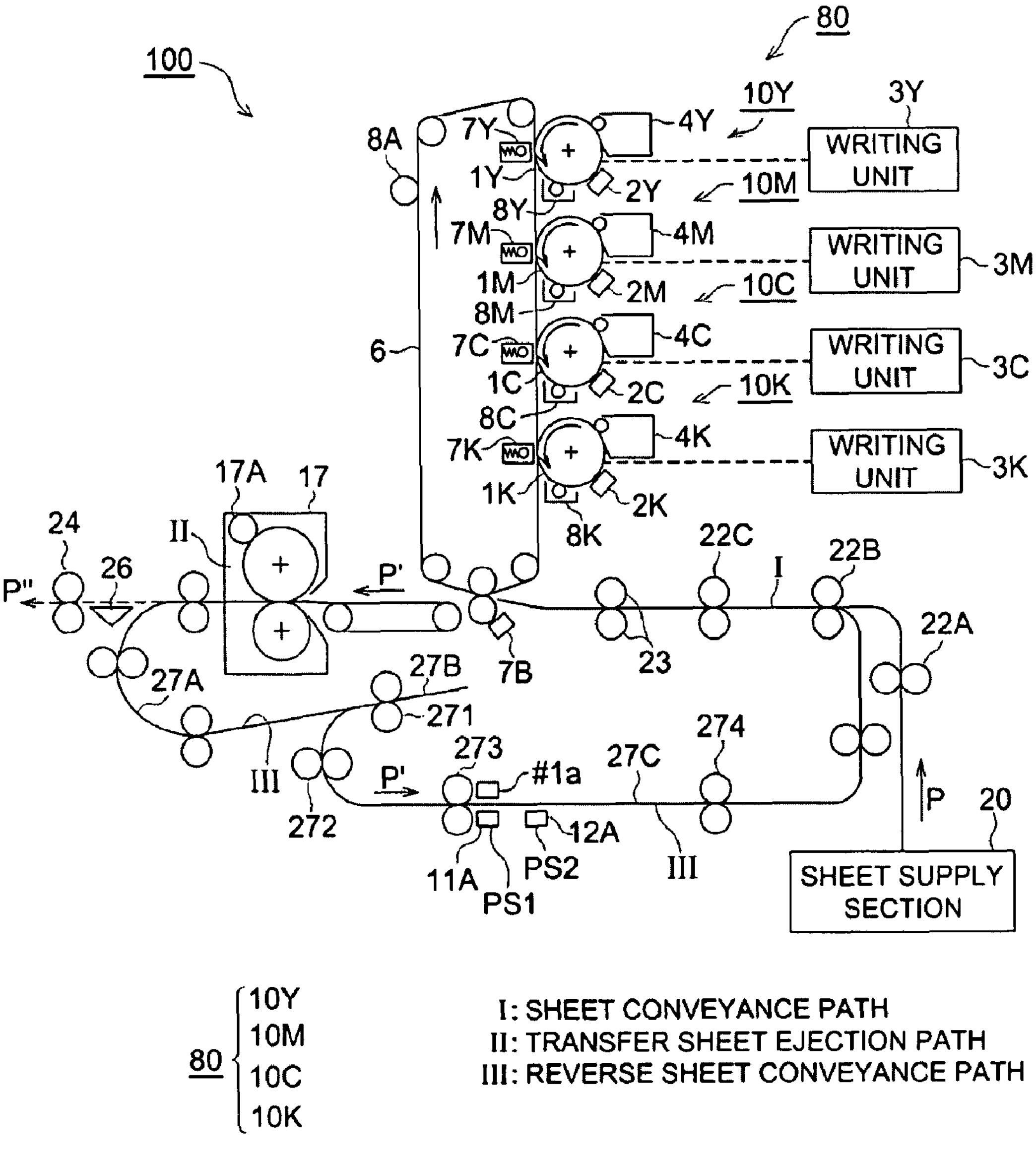
FIG. 1 is a conceptual diagram showing an example of the structure of color printer 100 representing an embodiment of the invention.

FIG. 1 is a conceptual diagram showing an example of the structure of color printer 100 representing an embodiment of the invention.

Color printer 100 of a tandem type shown in FIG. 1 constitutes an example of an image forming apparatus, and it has a two-sided image-forming mode. The two-sided image-forming mode, in this case, means operations to form a color image on each of the front surface and the rear surface of a prescribed sheet based on digital color image information. The color image information is supplied to the printer 100 from an outside apparatus such as a personal computer, and is transferred to image forming section 80.

The image forming section 80 is composed of image forming unit 10Y having photoconductor drum 1Y for yellow (Y) color, image forming unit 10M having photoconductor drum 1M for magenta (M) color, image forming unit 10C having photoconductor drum 1C for cyan (C) color, image forming unit 10K having photoconductor drum 1K for black (K) color, and intermediate transfer belt 6 of an endless type. In the image forming section 80, an image is formed and processed for each of the photoconductor drums 1Y, 1M, 1C and 1K, and toner images each having its own color formed and processed by the photoconductor drums 1Y, 1M, 1C and 1K for respective colors, are superimposed on the intermediate transfer belt 6 to form a color image.

In the present example, the image forming unit 10Y has therein electrifying unit 2Y, writing unit 3Y, developing unit 4Y and cleaning device 8Y for image forming body, in addition to the photoconductor drum 1Y, to form an image in a yellow (Y) color. The photoconductor drum 1Y constitutes an example of an image carrier, and for example, it is provided to be capable of rotating freely to be close to the upper part on the right side of the intermediate transfer belt 6, to form a toner image in Y color. In this example, the photoconductor drum 1Y is rotated counterclockwise by an unillustrated drive mechanism. On the obliquely lower part on the right side of the photoconductor drum 1Y, there is provided electrifying unit 2Y which electrifies a surface of the photoconductor drum 1Y to prescribed electric potential.

Nearly just beside the photoconductor drum 1Y, there is provided writing unit 3Y to face the photoconductor drum 1Y, to scan the photoconductor drum 1Y that has been charged in advance with a laser beam for Y color having prescribed intensity based on image data for Y color. The writing unit 3Y is composed of an unillustrated laser light source and a polygon mirror.

Laser beam light means so-called writing, in a main scanning direction, of Y color image data subjected to deflection scanning under rotation of a polygon mirror for Y color. The main scanning direction is a direction that is in parallel with the axis of the photoconductor drum 1Y. The photoconductor drum 1Y rotates in the sub-scanning direction. The sub-scanning direction is a direction that is perpendicular to the axis of the photoconductor drum 1Y. An electrostatic latent image for Y color is formed on the photoconductor drum 1Y by the rotation of the photoconductor drum 1Y in the sub-scanning direction and by deflection scanning in the main scanning direction of the laser beam light.

Developing unit 4Y is provided above the writing unit 3Y to operate to develop the electrostatic latent image for Y color formed on the photoconductor drum 1Y. The developing unit 4Y has an unillustrated developing roller for Y color. The developing unit 4Y is loaded with toner agents and carriers for Y color.

Developing roller for Y color having therein magnets conveys two-component developing agents obtained by stirring carriers and Y color toner agents in the developing unit 4Y to the opposed position on the photoconductor drum 1Y by rotation, so that the electrostatic latent image may be developed by toner agents for Y color. A toner image for Y color formed on the photoconductor drum 1Y is transferred onto intermediate transfer belt 6 through motions of primary transfer roller 7Y (primary transfer). On the lower part on the left side of the photoconductor drum 1Y, there is provided cleaning section 8Y that removes toner agents remaining on the photoconductor drum 1Y in the preceding writing (cleaning).

In the present example, image forming unit 10M is provided below the image forming unit 10Y. The image forming unit 10M has therein photoconductor drum 1M, electrifying unit 2M, writing unit 3M, developing unit 4M and cleaning device 8M for an image forming body, to form an image in magenta (M) color. Image forming unit 10C is provided below the image forming unit 10M. The image forming unit 10C has photoconductor drum 1C, electrifying unit 2C, writing unit 3C, developing unit 4C and cleaning device 8C for an image forming body, to form an image in cyan (C) color.

Image forming unit 10K is provided below the image forming unit 10C. The image forming unit 10K has therein photoconductor drum 1K, electrifying unit 2K, writing unit 3K, developing unit 4K and cleaning device 8K for an image forming body, to form an image in black (BK) color. An organic photo conductor (OPC) drum is used for photoconductor drums 1Y, 1M, 1C and 1K.

Incidentally, descriptions for functions of each member in image forming units 10M-10K will be omitted, because the description for the image forming unit 10Y can be applied to those for functions of respective members of image forming units 10M-10K, by reading Y as M, C and K. On each of the primary transfer rollers 7Y, 7M, 7C and 7K described above, there is impressed primary transfer bias voltage having polarity opposite to that of toner agents to be used (positive polarity in the present Example).

Intermediate transfer belt 6 constitutes an example of an image carrier, and polymerizes toner images transferred by primary transfer rollers 7Y, 7M, 7C and 7K, to form a color toner image (color image). For example, a color image formed on intermediate transfer belt 6 is conveyed toward secondary transfer roller 7A because the intermediate transfer belt 6 is rotated clockwise. The second transfer roller 7A is positioned to be under the intermediate transfer belt 6, and color toner images formed on the intermediate transfer belt 6 are transferred collectively onto sheet P (secondary transfer). In this case, sheet P on which an image has been formed is called transfer sheet P'. Secondary transfer roller 7A is subjected to removing (cleaning) for toner agents remaining on secondary transfer roller 7A in preceding transfer.

In this example, cleaning device 8A is provided at the upper part on the left of intermediate transfer belt 6, and it operates to remove toner agents remaining on the intermediate transfer belt 6 after transfer. The cleaning device 8A has a neutralizing section (not shown) that neutralizes electric charges on the intermediate transfer belt 6 and a pad that removes toner remaining on the intermediate transfer belt 6. A belt surface is cleaned by the cleaning device 8A, and the intermediate transfer belt 6 which has been neutralized by the neutralizing section enters the succeeding image forming cycle. Thus, a color image can be formed on sheet P.

Color printer 100 is equipped with sheet supply section 20, fixing device 17 and transfer sheet reverse section 90, in addition to image forming section 80. Under the aforesaid image forming unit 10K, there is provided sheet supply section 20 which is composed of plural unillustrated sheet supply trays. Sheets P in prescribed size are loaded in each sheet supply tray. In sheet conveyance path I covering from the sheet supply section 20 to the lower part of image forming unit 10K, there are provided conveyance rollers 22A and 22C, loop roller 22B and registration roller 23. For example, the registration roller 23 holds prescribed sheet P fed out of the sheet supply section 20 before the secondary transfer roller 7A, and then, feeds it out to the secondary transfer roller 7A in synchronizing with image timing. The secondary transfer roller 7A is caused to transfer a color image carried by the intermediate transfer belt 6 onto the prescribed sheet P controlled in terms of sheet conveyance by the registration roller 23.

On the downstream side of the aforesaid secondary transfer roller 7A, there is provided fixing device 17 which is caused to conduct fixing processing on transfer sheet P' onto which a color image has been transferred. The fixing device 17 has therein an unillustrated fixing roller, a pressure roller, a heater for heating (1H), and fixing cleaning section 17A. In the fixing processing, transfer sheet P' is caused to pass through a fixing roller heated by a heater for heating and a pressure roller, and the transfer sheet P' is heated and pressed. The transfer sheet P' after fixing is interposed between sheet ejection rollers 24 to be ejected on a sheet ejection tray (not shown) located outside the apparatus. The fixing cleaning section 17A is caused to remove toner agents remaining on the fixing roller in the preceding fixing processing (cleaning).

On the downstream side of the fixing device 17, there is provided transfer sheet reverse section 90 constituting an example of a reversing device that is caused to reverse transfer sheet P' on which the reference mark Mi and an image on the front surface are fixed by the fixing device 17. On the transfer sheet reverse section 90, there is provided reverse sheet conveyance path III that reverses transfer sheet P' in terms of the front and rear surfaces. On the reverse sheet conveyance path III, there are provided circulation sheet path 27A, reverse conveyance path 27B and sheet re-supply section 27C. On the reverse conveyance path 27B, there is provided reverse roller 271, and on the sheet re-supply section 27C, there are provided reverse roller 272 and conveyance rollers 273 and 274.

In this example, in the case of two-sided image-forming mode, when transfer sheet P' on which a reference mark and an image are formed on sheet P is ejected from the fixing device 17, the transfer sheet P' is branched by branching section 26 from transfer sheet ejection path II to reverse sheet conveyance path III, then, the transfer sheet P' passes through the circulation sheet path 27A, and is reversed in terms of its front and rear surfaces by the reverse conveyance path 27B constituting a sheet re-supply mechanism (ADU mechanism), and passes through the sheet re-supply section 27C to join at loop roller 22B of sheet supply path I.

In the present example, leading edge detection sensor PS1 constituting an example of the first detecting device is provided at the downstream side of conveyance roller 273 of the sheet re-supply section 27C. The leading edge detection sensor PS1 is provided on each of right and left sides of the sheet conveyance path to detect right and left sides of a leading edge of a transfer sheet, in the direction perpendicular to the sheet conveyance direction. It is preferable that the leading edge detection sensor PS1 is arranged at the location where transfer sheet P' has less curl and flutter. In this example, the leading edge detection sensor PS1 is arranged at the location between conveyance roller 273 on one side and conveyance roller 274 on the other side that is adjacent to the conveyance roller 273 on the upstream side of the sheet re-supply section 27C, or is arranged preferably at the location in the vicinity of the first conveyance roller 273 on the downstream side in the sheet re-supply section 27C.

The leading edge detection sensor PS1 detects the leading edge of the second surface (hereinafter referred to as a rear surface) of transfer sheet P' that is reversed by the reverse conveyance path 27B, and is caused to output leading edge detection signal SP1. The leading edge detection signal SP1 is outputted to control section 15. An optical-sensor of a transmission type is used for the leading edge detection sensor PS1. The leading edge detection sensor PS1 is composed of a light emitting element (hereinafter referred to as light source #1*a*) and a light receiving element (hereinafter referred to as light receiving section 11A).

With a prescribed distance on the downstream side of the leading edge detection sensor PS1, there is provided mark detection sensor PS2 constituting an example of the second detecting device that detects a position of the formed reference mark Mi on the transfer sheet P' based on a reference represented by the leading edge of the rear surface of the transfer sheet detected by the leading edge detection sensor PS1, and is caused to output mark detection signal SP2. The mark detection signal SP2 is outputted to control section 15.

An optical-sensor of a contact type is used for the mark detection sensor PS2. The optical-sensor of a contact type is composed of light source #2*a* and CCD (charge-coupled device) image pickup device (hereinafter referred to as light receiving section 12A). The mark detection sensor PS2 is also provided on each of right and left sides of the sheet conveyance path to detect right and left marks, in the direction perpendicular to the sheet conveyance direction.

If the leading edge detection sensor PS1 and the mark detection sensor PS2 are provided on the reverse sheet conveyance path III as stated above, reference mark Mi formed to be away from the leading edge of the rear surface of the transfer sheet by an actual length can be detected with excellent reproducibility after sheet reversing. Further, if optical-sensors each having a different principle of detection such as a transmission type and a reflection type are used as a detection device, sensor detection output is stabilized and sensor detection errors can be reduced.

Example 1

Each of FIGS. 2(A)-2(C) is a diagram showing an example of relationship between a distance from sensor to sensor L and a detection time difference T, as the First Example.

The distance from sensor to sensor L shown in FIG. 2(A) is a distance between an optical axis of light receiving section 11A of the leading edge detection sensor PS1 and an optical axis of light receiving section 12A of mark detection sensor PS2. In this example, if a focal length for image-capturing of reference mark Mi can be secured, a position of arranging the mark detection sensor PS2 is not restricted. However, it is preferable if the distance from sensor to sensor L is shorter, because an influence of fluctuations in transfer sheet conveyance speed is less if the mark detection sensor PS2 is arranged to be as close as possible to the leading edge detection sensor PS1 provided adjacently. The distance from sensor to sensor L is established, for example, to be about 50 mm (30-70 mm).

The detection time difference T shown in each of FIGS. 2(B) and 2(C) is a period of time from transfer sheet leading edge detection time t1 to reference mark Mi detection time t2. In this example, the position of the formed reference mark Mi is calculated based on relationship of positional arrangement for the leading edge detection sensor PS1 and mark detection sensor PS2 and on detection time difference T from transfer sheet leading edge detection time t1 to mark detection time t2.

In this example, when the distance from sensor to sensor L is made to be 50 mm, reference mark Mi is formed (set) at a position that is away from an edge of sheet P by distance 10 mm and a conveyance speed for transfer sheet P' is made to be 400 mm/sec, detection time difference T is shown by the following expression (1).

$$\begin{aligned}\text{Detection time difference } T &= (\text{Distance from sensor to sensor} + \text{Reference mark } Mi \text{ position}) / \text{Conveyance speed} \\ &= (50 + 10)/400 \\ &= 0.15 \text{ sec } (150 \text{ ms})\end{aligned} \tag{1}$$

If a detection system for transfer sheet P' after reversing is constructed as stated above, the leading edge of a sheet serving as a reference to grasp a position of the formed reference mark Mi, can be detected accurately, and therefore, a position of forming reference mark Mi, can be detected accurately, even if a behavior of an edge of a sheet is changed because of a linear speed of sheet feeding, a type of the sheet and of the sensor arrangement.

Each of FIGS. 3(A)-3(C) and of FIGS. 4(A)-4(C) is a diagram showing relationship (case 1, case 2) between reference mark Mi of transfer sheet P' and an image on the rear surface.

In this example, after the two-sided image-forming mode is established, desired images are formed on the front surface and the rear surface of sheet P. A margin for each of four sides of recording sheet P" after two-sided printing is cut and removed. On the circumference of image forming area IV on each of the front surface and the rear surface of recording sheet P", there exists a color of sheet P, for example, a white color in a shape of a picture frame.

On sheet P shown in FIG. 3(A), there are formed reference mark Mi (i=1-4) and an image on the front surface, for example, a letter “A” and its background image. Sheet P on which the reference mark Mi and an image for the front surface are formed turns to be transfer sheet P'. The reference mark Mi is formed on each of four corners of transfer sheet P'. In the present example, there are formed two reference marks M1 and M2 on the leading edge side of transfer sheet P". There are formed two reference marks M3 and M4 on the trailing edge side of transfer sheet P'. The reference mark Mi is formed to be hook-shaped (L-shaped) on the outer circumference of image forming area IV on the front surface of transfer sheet P'.

When transfer sheet P' shown in FIG. 3(B) is reversed, a portion which was a leading edge on sheet P becomes a trailing edge, and a portion which was a trailing edge on sheet P becomes a leading edge. Broken lines show reference mark Mi formed on the front surface of transfer sheet P', image "A" for the front surface and its background image. In this example, leading edge detection sensor PS1 detects the leading edge of transfer sheet P' and outputs leading edge detection signal SP1 to control section 15. Mark detection sensor PS2 detects reference marks M3 and M4 and outputs mark detection signal SP2 to control section 15. Due to this, the reference marks M3 and M4 each being formed to be away from the leading edge of the rear surface of a transfer sheet by an actual length can be detected with excellent reproducibility after the transfer sheet is reversed.

On the rear surface of transfer sheet P' shown in FIG. 3(C), there are formed, for example, a letter "B" and its background image. Reference mark Mi is not formed. Transfer sheet P' on which an image for the rear surface is formed turns to be recording sheet P". In this case, the image for the rear surface is formed based on the reference mark Mi formed on the front surface serving as a reference.

Concerning the recording sheet P" shown in FIG. 4(A), four sides thereof on which reference marks Mi are formed are cut by an unillustrated paper cutter to be removed. On the circumference of image forming area IV on each of the front surface and the rear surface, there exists, for example, a white color of sheet P, in a shape of a picture frame.

On the recording sheet P" shown in FIG. 4(B) whose four sides on the outer circumference have been cut off, there exists a color of sheet P, in a shape of a picture frame on the circumference of image forming area IV on the front surface, and there exists a color of sheet P, in a shape of a picture frame even on the circumference of image forming area on the rear surface of recording sheet P" shown in FIG. 4(C). In addition, an image forming position on the front surface of recording sheet P" is aligned with an image forming position on its rear surface. The reason for this is that the image forming position on the front surface of recording sheet P" and the image forming position on its rear surface were aligned accurately because the image for the rear surface was formed based on the forming position of reference mark Mi detected based on a reference of the leading edge of the rear surface of transfer sheet P' after reversing.

The foregoing naturally applies to the occasion wherein the recording sheet P" is cut under the condition that a color of sheet P does not exist in a shape of a picture frame on an outer circumference of the recording sheet P". Even in that case, a position of image forming on the front surface of recording sheet P" can be aligned with a position of image forming on its rear surface.

FIG. 5 is a block diagram showing an example of the structure of a control system of color printer 100. The color printer 100 shown in FIG. 5 is equipped with control section 15 that constitutes a control device. To the control section 15, there are connected operation section 14, fixing device 17, sheet supply section 20, image forming section 80, transfer sheet reverse section 90, leading edge detection sensor PS1 and mark detection sensor PS2.

The operation section 14 is operated to set a single-sided image-forming mode and a two-sided image-forming mode. The operation section 14 is also operated in the case of selecting a sheet supply tray loaded with sheets P in a desired size, in addition to the mode setting operation. After the image-forming mode is set by the operation section 14, mode setting signal S14 is outputted to the control section 15. After the tray is selected, tray selection signal S14' is outputted to the control section 15 from the operation section 14. A liquid crystal display device, a touch panel and a key input device are used for the operation section 14.

The sheet supply section 20 supplies sheet P to the image forming section 80 based on sheet supply control signal S20. For example, when selecting sheet P of a desired size from plural sheet supply trays, sheet supply control signal S20 is outputted to the sheet supply section 20 from control section 15. Sheet P of a desired size is fed out from the selected sheet supply tray based on an instruction to start sheet supply.

The image forming section 80 forms reference mark Mi and a desired color image on sheet P, based on image forming control signal S80. For example, the image forming section 80 forms an image on the rear surface of a transfer sheet based on a forming position of reference mark Mi of the transfer sheet P' detected by mark detection sensor PS2 based on the leading edge of the rear surface of the transfer sheet. The image forming control signal S80 is outputted to the image forming section 80 from control section 15.

The fixing device 17 is caused to fix the reference mark Mi and the color image on the transfer sheet P' based on fixing control signal S17. The fixing control signal S17 is outputted from the control section 15 to the fixing device 17.

Transfer sheet reverse section 90 reverses the transfer sheet P' after fixing based on reverse control signal S90. The reverse control signal S90 is outputted to transfer sheet reverse section 90 from control section 15. Leading edge detection sensor PS1 detects the leading edge of transfer sheet P' and outputs leading edge detection signal SP1 to control section 15. Mark detection sensor PS2 detects the reference mark Mi and outputs mark detection signal SP2 to control section 15.

The control section 15 has therein an unillustrated CPU (central processing unit), ROM (read only memory) and RAM (randomly writable and readable memory), and inputs leading edge detection signal SP1 and mark detection signal SP2, and controls the image forming section 80 so that an image may be formed on the rear surface of the transfer sheet based on a forming position of reference mark Mi of the transfer sheet P' whose reference point is the leading edge of the rear surface of the transfer sheet detected by mark detection sensor PS2.

For example, the control section 15 controls image forming section 80 so that reference mark Mi (i=1-4) may be formed at the position that is away from the leading edge of the front surface of sheet P by a prescribed length, and an image for the rear surface may be formed based on the reference mark Mi. If the control section 15 is constructed in this way, the image forming section 80 can be controlled so that an image for the rear surface may be formed at the position on the rear surface of the transfer sheet which is aligned more accurately relative to the reference mark Mi formed at the position being away from the leading edge on the rear surface of the transfer sheet by an actual length, compared with an occasion where the leading edge of a sheet and reference mark Mi are detected by a single detecting device.

Further, the control section 15 has a function (function to register the rear surface with the front surface) to adjust image writing timing based on a forming position of reference mark Mi on the front surface of a transfer sheet when forming an image on the rear surface. The function to register the rear surface with the front surface in this case is to compare a position to start writing on the rear surface with a position to start writing on the front surface, and to conduct adjustment of position to start writing by shifting a position in the minus (−) direction, if a position to start writing on the rear surface will be shifted more than a position to start writing on the front surface in the plus (+) direction. On the contrary, if a position to start writing on the rear surface will be shifted more than a position to start writing on the front surface in the minus (−) direction, the position is shifted in the plus (+) direction for position adjustment, in the aforesaid function.

Next, an image forming method in color printer 100 will be described. Each of FIG. 6 and FIG. 7 is a flow chart showing an image forming example (Case No. 1 or Case No. 2) in color printer 100.

In this Example, the image forming section 80 is controlled so that leading edge detection signal SP1 and mark detection signal SP2 may be obtained in the case of forming an image on the rear surface of transfer sheet P', and an image may be formed on the rear surface of transfer sheet based on a forming position of reference mark Mi of transfer sheet P' detected by mark detection sensor PS2, whose reference point is the leading edge on the rear surface of transfer sheet. Incidentally, there will be given an example wherein operation section 14 has been operated, the two-sided image-forming mode has already been set, mode setting signal S14 has been outputted to control section 15 from the operation section 14, and sheet P in a prescribed size is supplied from sheet supply section 20 to image forming section 80.

Under the image forming condition including the foregoing, the control section 15 conducts a front surface transfer control at step ST1 in a flow chart shown in FIG. 6. In this case, the control section 15 outputs image-forming control signal S80 to image forming section 80. In the image forming section 80, reference mark Mi and an image for the front surface are formed on intermediate transfer belt 6. For example, the image forming section 80 forms reference mark Mi (i=1-4) at the position being away from the leading edge of the front surface of sheet P by a prescribed length based on image-forming control signal S80, and forms a color image for the front surface based on the position of forming the reference mark Mi. Secondary transfer roller 7A transfers the reference mark Mi and the image for the front surface both on intermediate transfer belt 6 onto sheet P supplied from sheet supply section 20. The sheet P on which the reference mark Mi and the image for the front surface have been formed turns to be transfer sheet P'.

Next, the control section 15 conducts fixing control at step ST2. In this case, the control section 15 outputs fixing control signal S17 to fixing device 17. The fixing device 17 is caused to fix the reference mark Mi and the color image on the transfer sheet P' based on the fixing control signal S17.

Further, the control section 15 conducts sheet reverse control at step ST3. In this case, the control section 15 outputs reverse control signal S90 to transfer sheet reverse section 90. In the transfer sheet reverse section 90, transfer sheet P' after being fixed is reversed based on the reverse control signal S90. For example, after the transfer sheet P' on which the reference mark Mi and the color image are formed is ejected from the fixing device 17, the transfer sheet P' is branched at branching section 26 from transfer sheet ejection path II to reverse sheet conveyance path III, and it passes through circulation sheet path 27A, to be reversed by reverse conveyance path 27B in terms of the front and rear surfaces.

Then, at step ST4, the control section 15 acquires sheet leading edge detection information. In this case, leading edge detection sensor PS1 detects the leading edge of transfer sheet P' and outputs leading edge detection signal SP1 to control section 15. After that, the control section 15 acquires front surface reference mark detection information, at step ST5. In this case, mark detection sensor PS2 detects reference mark Mi and outputs mark detection signal SP2 to control section 15. Transfer sheet P' in reverse sheet conveyance path III is caused to pass through sheet re-supply section 27C and to join at loop roller 22B of sheet supply path I.

Further, control section 15 calculates a distance from the leading edge of the front surface of transfer sheet to the position of reference mark Mi, at step ST6. Examples of calculation of the distance in this case are those shown in FIGS. 2(A)-2(C).

Then, at step ST7, the control section 15 judges whether the position of forming reference mark Mi is within a tolerance for correction or not. At this time, the control section 15 compares a calculated value of distance with an upper limit distance reference value and a lower limit distance reference value, and when the calculated value of distance exceeds the upper limit distance reference value and when the calculated value of distance is less than the lower limit distance reference value, the control section 15 judges that the position of forming the reference mark Mi is out of the tolerance for correction, while, when the calculated value of distance is within the upper and lower limit distance reference values, the control section 15 judges that the position of forming the reference mark Mi is within the tolerance for correction.

When the position of the reference mark Mi is judged to be within the tolerance for correction in the aforesaid discrimination results, the control section 15 moves its process to step ST8 to conduct plus-minus (±) adjustment for the position to start writing on the rear surface. When a position to start writing on the rear surface will be compared with a position to start writing on the front surface, and if the position to start writing on the rear surface is shifted to the plus (+) direction than the position to start writing on the front surface, a writing start position adjustment to shift the position to the minus (−) direction is conducted. In contrast to this, when the position to start writing on the rear surface will be shifted to the minus (−) direction than the position to start writing on the front surface, a writing start position adjustment to shift a position in the plus (+) direction is conducted (function to register the rear surface with the front surface).

Then, at the step ST9 shown in FIG. 7, the control section 15 conducts rear surface transfer control. In this case, the control section 15 outputs image-forming control signal S80 to image forming section 80. The image forming section 80 forms toner images each having each of colors of Y, M, C and K for images for rear surface, with photoconductor drums 1Y, 1M, 1C and 1K for respective colors, based on image-forming control signal S80. At this time, the image forming section 80 forms toner images each having its own color on photoconductor drums 1Y, 1M, 1C and 1K, based on the forming position of the reference mark Mi of the transfer sheet P' detected by mark detection sensor PS2 in advance, whose reference point is a leading edge of the rear surface of transfer sheet.

After that, toner images each having each color formed by photoconductors 1Y, 1M, 1C and 1K for respective colors are superimposed on intermediate transfer belt 6. In the image forming section 80, images for the rear surface formed on intermediate transfer belt 6 are transferred onto the rear surface of the transfer sheet. Due to this, transfer sheet P' on which a color image is formed on its rear surface turns to be recording sheet P".

Then, at the step ST10, the control section 15 conducts fixing control. At this time, the control section 15 outputs fixing control signal S17 to fixing device 17. The fixing device 17 is caused to fix a color image on the rear surface side of recording sheet P" based on the fixing control signal S17.

After that, the control section 15 conducts sheet ejection control at the step ST11. In this case, branching section 26 is caused to feed out recording sheet P" to an unillustrated sheet ejection tray from transfer sheet ejection path II, without branching the sheet to reverse sheet conveyance path III. Owing to this, it is possible to obtain recording sheet P" wherein color images are printed on the front surface and the rear surface of sheet P fed out of sheet supply section 20.

Incidentally, when the forming position of reference mark Mi is judged to be out of the tolerance for correction at the aforesaid step ST7, the process moves to step ST12, and the control section 15 conducts error display control for defective position of the front surface image. For example, an unillustrated liquid crystal display device is provided on operation section 14, and a message such as "a forming position of reference mark Mi is out of a tolerance for correction" is displayed on the liquid crystal display device.

As stated above, in color printer 100 and an image forming method in the First Example, leading edge detection sensor PS1 and mark detection sensor PS2 each having a different function of detection are provided separately on reverse sheet conveyance path III, and image forming section 80 forms four reference marks M1-M4 at the position being away from the leading edge on the front surface of sheet P by a prescribed length, and forms an image for the front surface based on the forming position of the reference marks M1 and M2. Transfer sheet reverse section 90 reverses transfer sheet P' on which the reference marks M1-M4 and an image for the front surface are formed by image forming section 80. The leading edge detection sensor PS1 detects the leading edge on the rear surface of sheet P reversed by the transfer sheet reverse section 90. The mark detection sensor PS2 detects a forming position of reference mark Mi on the sheet P based on the leading edge on the rear surface of the transfer sheet detected by the leading edge detection sensor PS1.

Under the assumption of the foregoing, the image forming section 80 forms an image on the rear surface of the transfer sheet based on the forming position of reference mark Mi on the sheet P detected by mark detection sensor PS2, whose reference point is the leading edge on the rear surface of the transfer sheet.

Therefore, it is possible to form an image for the rear surface at the position on the rear surface of the transfer sheet that is aligned to with a higher accuracy, compared with an occasion wherein the leading edge of the sheet and reference marks M3 and M4 are detected by a conventional single detecting device, concerning reference marks M3 and M4 formed at the position that is away from the leading edge on the rear surface of the transfer sheet by an actual length.

Due to this, in transfer sheet ejection path II and reverse sheet conveyance path III which reverse transfer sheet P' on which reference marks M1-M4 and an image for the front surface are formed, it is possible to align a position of forming an image formed on the front surface of the sheet with a position of forming an image formed on the rear surface of the transfer sheet accurately without being affected by a shape of the leading edge of the sheet and a position of passage, even when an edge portion of a sheet is curled or is fluttered.

Example 2

FIG. 8 is a perspective view showing an example of structure of optical-sensor PS3 of a multi-functional type relating to the Second Example.

In this example, detection of the leading edge of transfer sheet P' and detection of a position of a reference mark are conducted respectively by optical-sensor PS3 having different sensing systems with the same light receiving section 13A, whereby, a distance from the leading edge of a transfer sheet to an image of a reference mark is detected.

The optical-sensor PS3 of a multi-functional type shown in FIG. 8 is one capable of being installed in color printer 100, and it has a sheet leading edge detection function of leading edge detection sensor PS1 and a reference mark detection function of mark detection sensor PS2. The optical-sensor PS3 is provided on each of both right and left sides of the sheet conveyance path for detecting right and left on the leading edge and right and left marks, in the direction perpendicular to the sheet conveyance direction. In the diagram, PS3 (L) represents the left side, and PS3 (R) represents the right side.

The optical-sensor PS3 (L) has two types of light sources #1*a* and #2*a* for the common light-receiving section 13A. The light-source #1*a* for detection of leading edge is arranged on the plane facing light-receiving section 13A, and the sensor conducts leading edge detection for transfer sheet P' with transmitted light coming from light source #1*a*. The light source #2*a* for detecting reference marks is arranged on the same plane as that for light-receiving section 13A, so that the section detects reflected light coming from transfer sheet P'.

In this example, light source #2*a* and light-receiving section 13A are made to be a unified part, and for example, is mounted on chassis 31 of transfer sheet reverse path III shown in FIG. 8. The light source #2*a* and the light-receiving section 13A are arranged so that their optical axes may point upward. The light source #1*a* is fixed on installation frame 32A mounted on the chassis 31. Incidentally, optical-sensor PS3 (R) is composed of light source #1*b*, light source #2*a*, light-receiving section 13B and of installation frame 32B. Its functions, arrangement and how to mount are the same as those for optical-sensor PS3 (L), and an explanation for them will be omitted here accordingly.

FIG. 9 is a front view showing an example of operations of optical-sensor PS3 of a multi-functional type. To the control section 15 shown in FIG. 9, there are connected light sources #1*a* and #2*a* of optical-sensor PS3. Its light-receiving section 13A is connected to the control section 15. When detecting the leading edge of transfer sheet P', the control section 15 turns on drive power source V1*a* to put light source #1*a* on. After the leading edge of transfer sheet P' is detected, drive power source V1*a* is turned off to put light source #1*a* off. When the leading edge of transfer sheet P' is detected by the light-receiving section 13A, leading edge detection signal SP1' is outputted to control section 15.

The leading edge detection signal SP1' from the light-receiving section 13A is inputted to the control section 15, and the section judges whether the leading edge of the transfer sheet P' was detected or not by comparing the signal level based on the leading edge detection signal SP1' with a threshold value established in advance. When detecting reference mark Mi on transfer sheet P', the control section 15 turns on drive power source V2*a* to put light source #2*a* on, while keeping the light source #1*a* to be put off. After the reference mark Mi is detected, drive power source V2*a* is turned off and the light source #2*a* is put off. The light-receiving section 13A outputs mark detection signal SP' to the control section 15 when detecting the reference mark Mi of the transfer sheet P'. The control section 15 judges whether the reference mark Mi has been aligned (detected) or not by conducting pattern recognition for a reference mark image as an expected value and a reference mark image based on mark detection signal SP2'.

FIG. 10 is a flow chart showing an example of lighting control of optical-sensor PS3 in control section 15.

An assumption in this example is that the control section 15 controls lighting of light sources #1*a* and #2*a* of optical-sensor PS3 based on a single-sided image-forming mode and a two-sided image-forming mode.

By using the foregoing as a control condition, the control is branched based on whether a single-sided image-forming mode or on a two-sided image-forming mode at step ST21 of the flow chart shown in FIG. 10.

When the two-sided image-forming mode is set, the control section 15 puts light source #1*a* on at step ST22. At this time, drive voltage V1*a* is supplied to light source #1*a* from the control section 15.

Next, the process moves to step ST23 where the control section 15 judges whether the leading edge of transfer sheet P' has been detected or not. In this case, leading edge detection signal SP1' from light-receiving section 13A is inputted to the control section 15, and the section judges whether the leading edge of the transfer sheet P' has been detected or not, by comparing the signal level based on the leading edge detection signal SP1' with a threshold value established in advance.

When the signal level based on the leading edge detection signal SP1' exceeds the threshold value established, namely, when the leading edge of the transfer sheet P' has been detected, the process moves to step ST24 at which the light source #1*a* is put off. In this case, the control section 15 stops supplying drive voltage V1*a* to the light source #1*a*. After that, the control section 15 puts light source #2*a* on at step ST25. At this time, drive voltage V2*a* is supplied to light source #2*a* from control section 15.

Next, the process moves to step ST26 where the control section 15 judges whether the reference mark Mi of the transfer sheet P' has been detected or not. At this time, mark detection signal SP2' from light-receiving section 13A is inputted to the control section 15, and the section judges whether the reference mark Mi of transfer sheet P' has been detected being aligned or not, by conducting pattern recognition for the reference pattern image established in advance and for the reference pattern image based on the mark detection signal SP2'. As a result of the pattern recognition, when alignment between a reference pattern image based on leading edge detection signal SP2' and reference mark Mi of transfer sheet P' is detected, namely, when the reference mark Mi of transfer sheet P' is detected, the process moves to step ST27 and light source #2*a* is put off. At this time, the control section 15 stops supplying drive voltage V2*a* to light source #2*a*. Thus, the control section 15 terminates its lighting control.

In color printer 100 relating to the Second Example, optical-sensor PS3 of a multi-functional type is provided, and the control section 15 is caused to control lighting of light sources #1*a* and #2*a* of optical-sensor PS3.

Compared with the First Example, therefore, the Second Example makes it possible to improve detection accuracy, to omit a light-receiving section, to allot the space for installation of the sensor for another mechanism element and to contribute greatly to cost reduction of color printer 100. Incidentally, the flow chart shown in FIG. 10 can naturally be applied also to control of lighting for light sources #1*a* and #2*a* of PS1 and PS2 relating to the First Example.

The present invention can be applied extremely favorably to a tandem type color printer and a color copying machine having an intermediate transfer belt and a photoconductor drum, and to a multifunctional machine having functions of the foregoing.

In the image forming method relating to the present invention, a reference image is formed at the position that is away from the leading edge of the first surface of a sheet by a prescribed length, and an image forming device that forms an image for the first surface based on the forming position of the reference image is provided, and an image is formed on the second surface of a sheet based on the forming position of the reference image of the sheet whose reference point is the leading edge of the second surface of the sheet.

In the constitution stated above, an image for the second surface can be formed at the position of the second surface of a sheet aligned more accurately relative to the reference image formed at the position that is away from the leading edge of the second surface of a sheet by an actual length when comparing with an occasion to detect the leading edge of a sheet and a reference image with a single detecting device. Therefore, even when an edge portion of a sheet is curled or is fluttered in the conveyance path that reverses a sheet on which a reference image and an image for the first surface are formed, a forming position of an image formed on the first surface of the sheet and a forming position of an image formed on the second surface of the sheet can be aligned accurately without being affected by a shape of the leading edge of the sheet and a position of passage.

In the image forming apparatus relating to the invention, it is possible to control the image forming device to form an image for the second surface at the position on the second surface of the sheet aligned more accurately relative to the reference image formed at the position that is away from the leading edge of the second surface of a sheet by an actual length when comparing with an occasion to detect the leading edge of a sheet and a reference image with a single detecting device, because a control device for controlling image forming is provided.

In the image forming apparatus relating to the invention, it is possible to detect a reference image formed at the position that is away from the leading edge of the second surface of the sheet by an actual length with excellent reproducibility after reversing of the sheet, because the first and the second detecting devices are provided on the reverse conveyance path.

In the image forming apparatus relating to the invention, sensor detection output is stabilized and sensor detection errors can be reduced, because an optical-sensor of a transmission type and that of a contact type are used.

In the image forming apparatus relating to the invention, an optical-sensor of a multi-functional type is used, which realizes space-saving for the sensor, and contributes greatly to downsizing of the overall apparatus.

What is claimed is:

1. An image forming apparatus comprising:

an image forming device for forming a reference image at a position which is away from a leading edge of a first surface of a sheet by a prescribed length, and for forming an image for the first surface with reference to the position of the formed reference image;

a reversing device for reversing the sheet on which the reference image and the image for the first surface are formed by the image forming device;

a first detecting device for detecting a leading edge of a second surface of the sheet reversed by the reversing device; and a second detecting device for detecting the position of the formed reference image of the sheet with reference to the leading edge of the second surface detected by the first detecting device, wherein a reverse sheet conveyance path for reversing the sheet in terms of front and rear surfaces is provided on the reversing device, wherein the first and the second detecting devices are provided on the reverse sheet conveyance path, and the first detecting device is arranged at a location on a downstream side and in a vicinity of a first conveyance roller from among a plurality of conveyance rollers in a straight path of a sheet re-supply section of the reverse sheet conveyance path, and wherein the image forming device forms an image on the second surface of the sheet with reference to the position of the formed reference image on the sheet detected by the second detecting device, a reference point of the position of the formed reference image being the leading edge of the second surface of the sheet.

2. The image forming apparatus of claim 1 further comprising:

a control device for controlling the image forming device so that an image is formed on the second surface of the sheet with reference to the position of the formed reference image on the sheet detected by the second detecting device, the reference point of the position of the formed reference image being the leading edge of the second surface of the sheet.

3. The image forming apparatus of claim 2, wherein the control device has a function to adjust image writing timing with reference to the position of the formed reference image on the first surface of the sheet when forming an image for the second surface.

4. The image forming apparatus of claim 3, wherein the control device compares a position to start writing on the second surface with a position to start writing on the first surface, and if the position to start writing on the second surface will be shifted more than the position to start writing on the first surface in a plus (+) direction, the control device conducts adjustment of the position to start writing by shifting the position to start writing on the second surface in a minus (−) direction, and if the position to start writing on the second surface will be shifted more than the position to start writing on the first surface in a minus (−) direction, the control device shifts the position to start writing on the second surface in a plus (+) direction for position adjustment.

5. The image forming apparatus of claim 3, wherein the control section judges whether the position of the formed reference image is within a tolerance for correction or not.

6. The image forming apparatus of claim 1, wherein an optical-sensor of a transmission type is used for the first detecting device and an optical-sensor of a contact type is used for the second detecting device.

7. The image forming apparatus of claim 1, wherein an optical-sensor of a multifunctional type having a detecting function of the first detecting device and a detecting function of the second detecting device is used.

8. The image forming apparatus of claim 1, wherein the first detecting device is provided on each of right and left sides of a sheet conveyance path to detect right and left sides of the leading edge of the sheet in a direction perpendicular to a sheet conveyance direction.

9. The image forming apparatus of claim 1, wherein the first detecting device is arranged at a location between the first conveyance roller and a second conveyance roller in the straight part of the sheet resupply section of the reverse sheet conveyance path.

10. The image forming apparatus of claim 1, wherein the second detecting device is provided on each of right and left sides of a sheet conveyance path to detect right and left sides of the reference image in a direction perpendicular to a sheet conveyance direction.

11. The image forming apparatus of claim 1, wherein a distance from the first detecting device to the second detecting device is established to be 30-70 mm.

12. An image forming method comprising steps of:

forming a reference image at a position which is away from a leading edge of a first surface of a sheet by a prescribed length;

forming an image for the first surface with reference to the position of the formed reference image;

reversing the sheet on which the reference image and the image for the first surface are formed;

detecting a leading edge of a second surface of the reversed sheet at a location on the reverse sheet conveyance path of a downstream side and in a vicinity of a first conveyance roller from among a plurality of conveyance rollers in a straight path of a sheet re-supply section of the reverse sheet conveyance path;

detecting the position of the formed reference image on the sheet with reference to the detected leading edge of the second surface at a location of the reverse sheet conveyance path; and forming an image for the second surface with reference to the position of the formed reference image detected with reference to the leading edge of the second surface of the reversed sheet.

13. The image forming method of claim 12, wherein image writing timing is adjusted with reference to the position of the formed reference image on the first surface of the sheet when forming an image for the second surface.

14. The image forming method of claim 13, wherein a position to start writing on the second surface is compared with a position to start writing on the first surface, and if the position to start writing on the second surface will be shifted more than the position to start writing on the first surface in a plus (+) direction, adjustment of the position to start writing is conducted by shifting the position to start writing on the second surface in a minus (−) direction, and if the position to start writing on the second surface will be shifted more than the position to start writing on the first surface in a minus (−) direction, the position to start writing on the second surface is shifted in a plus (+) direction for position adjustment when forming an image for the second surface.

15. The image forming method of claim 13, wherein whether the position of the formed reference image is within a tolerance for correction or not is judged when forming an image for the second surface.

* * * * *